(12) United States Patent
Newman

(10) Patent No.: US 9,166,385 B2
(45) Date of Patent: Oct. 20, 2015

(54) PORTABLE CABLE MANAGEMENT DEVICE

(71) Applicant: Winston Newman, Owensboro, KY (US)

(72) Inventor: Winston Newman, Owensboro, KY (US)

( * ) Notice: Subject to any disclaimer, the term of this patent is extended or adjusted under 35 U.S.C. 154(b) by 170 days.

(21) Appl. No.: 13/950,087

(22) Filed: Jul. 24, 2013

(65) Prior Publication Data

US 2014/0027582 A1    Jan. 30, 2014

Related U.S. Application Data

(60) Provisional application No. 61/676,292, filed on Jul. 26, 2012.

(51) Int. Cl.
*F16B 45/00* (2006.01)
*H02G 1/00* (2006.01)
*F16L 3/22* (2006.01)
*H02G 3/30* (2006.01)

(52) U.S. Cl.
CPC *H02G 1/00* (2013.01); *F16B 45/00* (2013.01); *F16L 3/22* (2013.01); *H02G 3/30* (2013.01)

(58) Field of Classification Search
CPC .............. H02G 1/00; H02G 3/30; F16L 3/22; F16B 45/00

USPC .......... 248/65, 213, 215, 228.7, 231.81, 301, 248/304, 339; 211/119.004
See application file for complete search history.

(56) References Cited

U.S. PATENT DOCUMENTS

| | | | | | |
|---|---|---|---|---|---|
| 1,216,730 | A | * | 2/1917 | Quiggle | 297/188.2 |
| 2,157,001 | A | * | 5/1939 | Morley | 248/205.6 |
| 2,743,023 | A | * | 4/1956 | Larson | 211/96 |
| 2,925,916 | A | * | 2/1960 | Pollock | 211/119.004 |
| 3,907,118 | A | * | 9/1975 | Pelavin | 211/113 |
| 3,989,213 | A | * | 11/1976 | Allen | 248/214 |
| 5,553,823 | A | * | 9/1996 | Protz, Jr. | 248/304 |
| 5,908,119 | A | * | 6/1999 | Kump et al. | 211/113 |
| 6,302,365 | B1 | * | 10/2001 | Catanzarite et al. | 248/339 |
| 6,311,851 | B1 | * | 11/2001 | Knudsen et al. | 211/13.1 |
| 6,663,069 | B1 | * | 12/2003 | Norberg | 248/316.7 |
| 7,118,001 | B2 | * | 10/2006 | Klein et al. | 211/90.03 |
| 7,234,671 | B2 | * | 6/2007 | Avinger | 248/215 |
| 7,887,017 | B2 | * | 2/2011 | Moran | 248/339 |

* cited by examiner

*Primary Examiner* — Anita M King
(74) *Attorney, Agent, or Firm* — Richards Patent Law P.C.

(57) ABSTRACT

A portable cable management device that includes various attachment mechanisms adapted for securing the device to various surfaces and structures including an I-beam flange attachment mechanism, a 2"×4" attachment mechanism, one or more drywall attachment mechanisms, a metal framing stud attachment mechanism, and one or more hooks including a throat for holding cables.

9 Claims, 5 Drawing Sheets

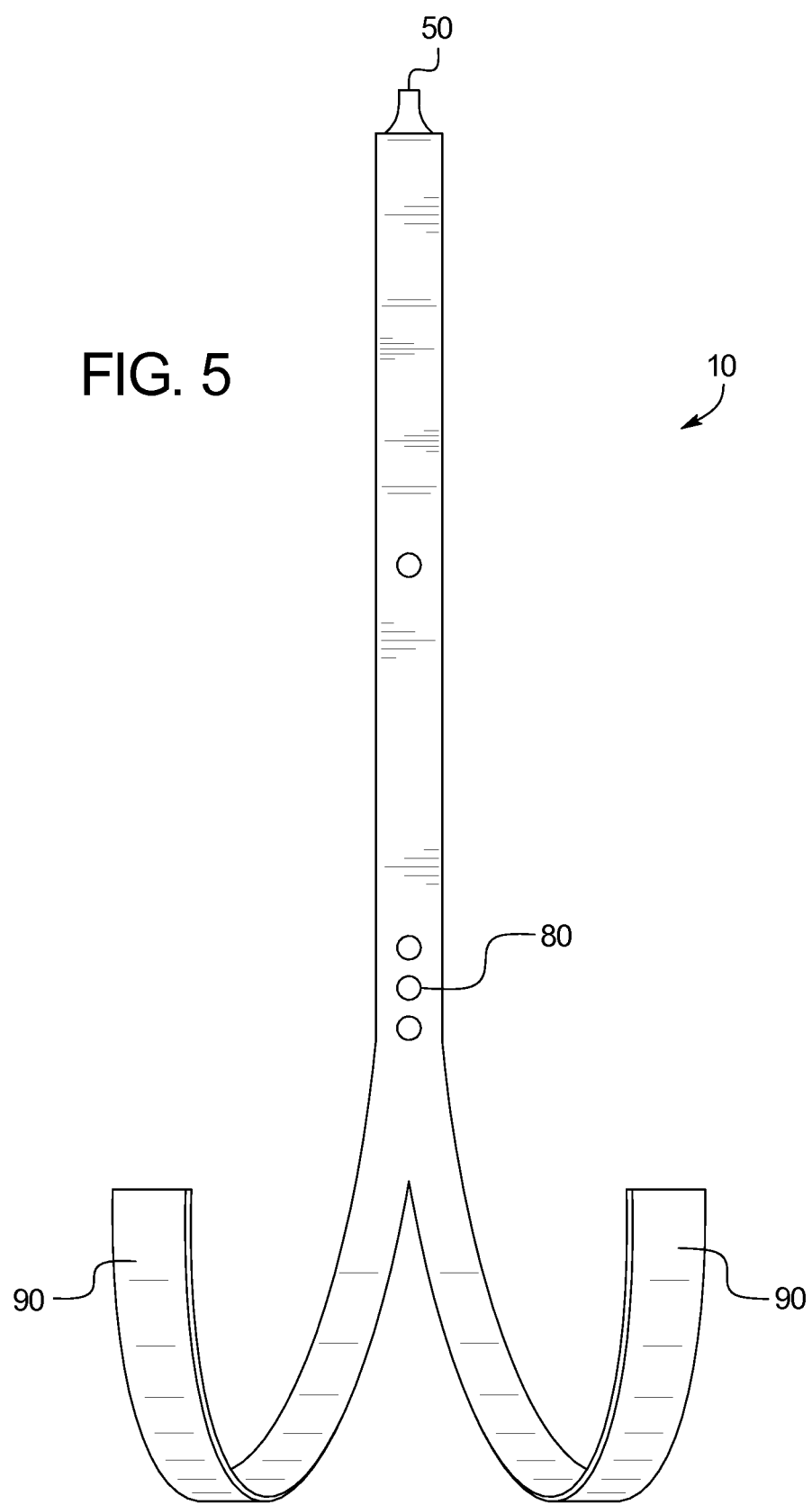

PORTABLE CABLE MANAGEMENT DEVICE

CROSS-REFERENCE TO RELATED APPLICATIONS

This application incorporates by reference and claims priority to U.S. Provisional Application No. 61/676,292 filed on Jul. 26, 2012.

BACKGROUND OF THE INVENTION

The present subject matter discloses a portable cable management device. The portable cable management device includes various attachment mechanisms adapted for securing the device to various surfaces and structures, as described further herein.

Construction sites present inherently dangerous conditions. In a typical construction work environment, there may be various teams of tradesmen simultaneously operating in partially constructed structures, in loud and congested spaces, using various types of equipment and tools, often with uncoordinated movement through and around the space. As a result, construction sites are high-risk areas for accidents and personal injury.

Within a given worksite there may be numerous equipment cords, extension cords, etc. for powering the various tools and equipment used on site. Adding the electrical cords to an already dangerous site only increases the risk to the people on site. Cords present tripping hazards, severed cords present risk of electrocution, etc. As a result, cable management is an important safety consideration on construction sites.

While construction sites are an extreme example of a location in which cable management is an important safety consideration, it can be seen that the same principles apply in nearly every instance in which electrical cords are used. Whether in a residential or industrial setting, cord management is a legitimate safety concern.

Accordingly, there is a need for a portable cable management device that enables a user to quickly and securely provide a temporary solution for managing cable placement in a workspace or other area.

BRIEF SUMMARY OF THE INVENTION

The present disclosure provides a portable cable management device that enables a user to quickly and securely provide a temporary solution for managing cable placement in a workspace or other area. More specifically, the present subject matter discloses a cable management device that includes various attachment mechanisms adapted for securing the device to various surfaces and structures. Various examples are provided herein.

In one embodiment, the device provided herein includes a roughly S-shaped body adapted to be secured to any of various structural elements and provide a throat for carrying or otherwise managing the placement of one or more cords.

In an exemplary embodiment, the device includes an I-beam flange attachment mechanism, a 2"×4" attachment mechanism, one or more drywall attachment mechanisms, a metal framing stud attachment mechanism, and a throat for cord placement.

The I-beam flange attachment may be, for example, a metal or plastic clip used to secure the device to the flange of an I-beam. As shown in the appended drawings, the I-beam flange attachment may be similar in structure and function to the metal clip adapted for use with typical measuring tape housings. In one contemplated embodiment, the I-beam flange attachment may be located along a generally horizontally disposed upper surface of the device. The generally horizontally disposed upper surface of the device may further include a standoff for drywall screws that may function as one of the drywall attachment mechanisms, through which a user may secure the device to drywall or similar materials. The I-beam flange attachment may include a tensioner to secure the I-beam flange attachment to the I-beam flange and prevent the device from sliding off the beam flange. The tensioner may include a wedge swivel that would slide over the clip and press down on the clip to increase grip.

The 2"×4" attachment mechanism may be a generally rectangular three-sided, open structure near the top of the device. The size of the opening of the 2"×4" attachment mechanism may be appropriate for securely hanging the device over a horizontally secured 2"×4" beam. At least one side wall of the 2"×4" attachment mechanism may include a stud bulb for securing the 2"×4" within the 2"×4" attachment mechanism.

Beneath the 2"×4" attachment mechanism, the device may have an angled body portion that leads to a second drywall attachment mechanism, including a stand-off for drywall screws. The standoff may extend from the device a distance equal to the rear most wall of the 2"×4" attachment mechanism, such that the rear wall of the 2"×4" attachment mechanism would sit flush against a vertically disposed object to which the device may be secured using the drywall attachment mechanism.

Adjacent to and beneath the second drywall attachment mechanism may be a metal framing stud attachment mechanism. The metal framing stud attachment mechanism may be similar in form and function to the I-beam flange attachment, only with the metal framing stud attachment mechanism being generally vertically disposed at the rear of the device, rather than generally horizontally disposed at the top of the device.

One or more knock-out screw holes may be provided at various locations on the device. In one example, knock-out screw holes are provided directly beneath the metal framing stud attachment mechanism and above the throat. In some instances, the knock-out screw holes may be used as a secondary means for securing the device to an object. For example, one or more of the I-beam flange attachment mechanism, the 2"×4" attachment mechanism, the one or more drywall attachment mechanisms, and/or the metal framing stud attachment mechanism may primarily secure the device to a structure, while one or more screws provided through the knock-out screw holes may secondarily secure the device to the structure.

At the bottom of the embodiment described, the device may include a throat for managing cords. In one example, the throat is a single unitary hook shaped structure. In other examples, the throat may include a plurality of hooks. For example, the hooks may be staggered or fanned out horizontally, vertically, or both. Further the hooks may swivel with respect to the body of the device, enabling the hooks to operate in various directions of cord placement.

In some embodiments of the device, a hook shaped throat may be removably secured to the bottom of the device. For example, the body of the device may include an internally threaded socket into which an externally threaded throat may be attached. Additionally, the ability of the device to accept removable throats may enable the device to be used with various throat configurations.

In an embodiment, a cable management device includes a body including a top section, middle section, and a bottom section, the top section defines a first hook, wherein the first hook includes a first wall located along a first plane, the first wall includes a first end and a second end, wherein the first end is free and the second end transitions to a first end of a second wall, wherein the second wall is perpendicular to the first wall, wherein the second wall defines a second plane, wherein a second end of the second wall transitions to a first end of a third wall, wherein the third wall is perpendicular to the second wall and parallel to the first wall, wherein a second end of the third wall is located further from the second plane than the first end of the first wall is from the second plane; wherein the second end of the third wall transitions to the middle section which transitions to the bottom section of the body, wherein the bottom section of the body includes a second hook, wherein the second hook includes a shank portion and bend portion; a first clip located along an outer side of the second wall, further including a receiving end facing the first plane; a second clip located along an outer side of the shank portion, further including a receiving end facing the bottom of the device; a first standoff located along the outer side of the second wall, wherein the first standoff includes a central bore extending through the length of the first standoff and through the second wall; and a second standoff located along the outside side of the shank portion, wherein the second standoff includes a central bore extending through the length of the second standoff and through the shank portion.

In some embodiments, the cable management device further includes a protrusion located along an inner side of the third wall. In some embodiments, the protrusion is located further from the second plane than the first end of the first wall. In some embodiments, the cable management device further includes a removable connector connecting the second hook to the body. In some embodiments, the cable management device further includes a rotatable connector connecting the second hook to the body. In some embodiments, the bottom section of the body further includes a third hook. In some embodiments, the cable management device further includes a removable connector connecting the second hook and the third hook to the body. In some embodiments, the cable management device further includes a rotatable connector connecting the second hook and the third hook to the device. In some embodiments, the second standoff extends outward from the shank portion to at least the distance the second clip extends from the shank portion.

An advantage of the system provided herein is it provides a universal portable cord management device that may be adapted for use in many environments and secured to any of numerous structures.

Another advantage of the system provided herein is it provides a cord management that increases safety on construction sites.

A further advantage of system provided herein is it provides a cord management device that is adaptable for residential use.

Additional objects, advantages and novel features of the examples will be set forth in part in the drawings and description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 5 is a front view of a further example of a cable management device including a twin hooks design.

DETAILED DESCRIPTION OF THE INVENTION

Figure 1:
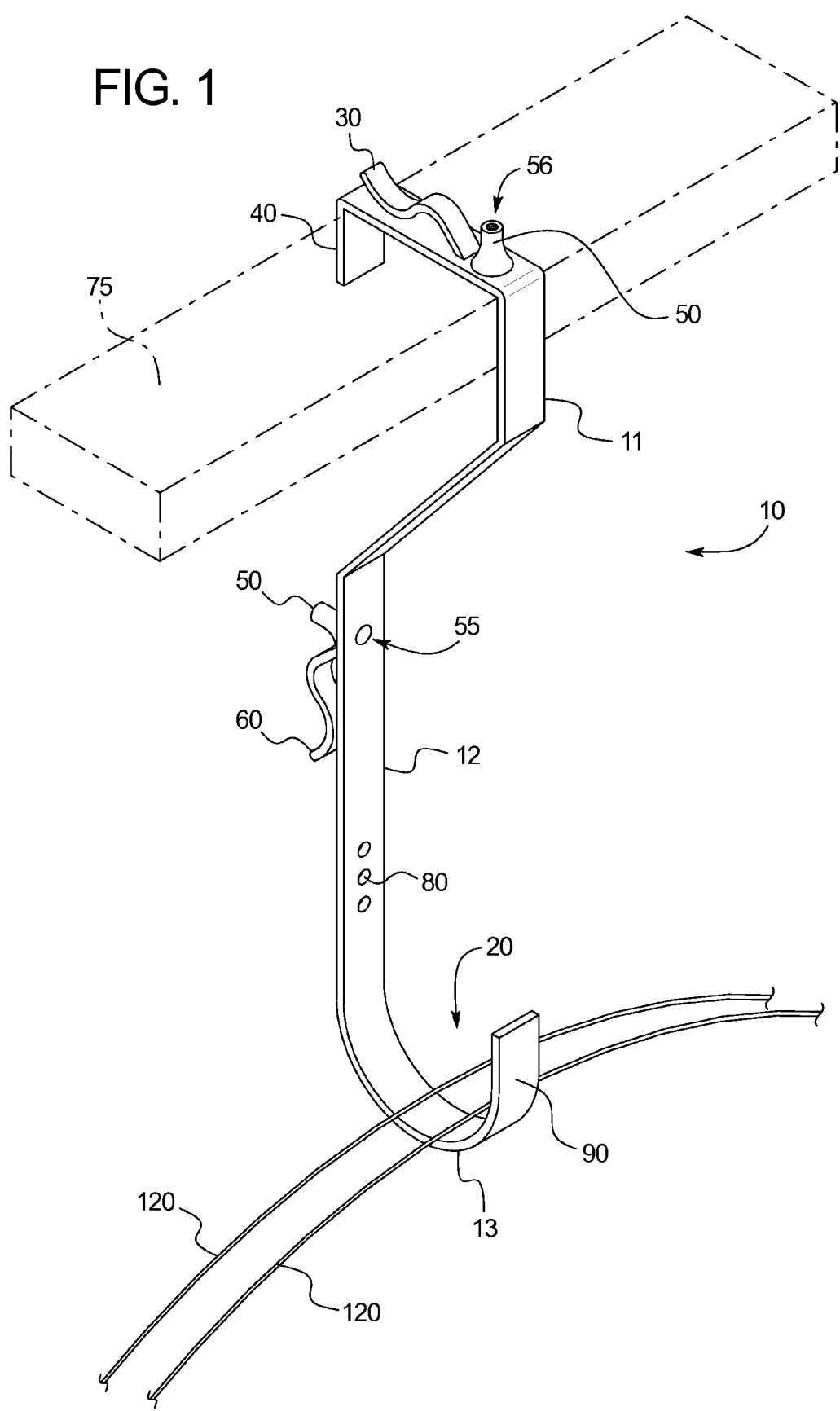
FIG. 1 is a perspectives view of an example of a cable management device.

FIG. 1 illustrates an example of a cable management device 10. In one embodiment, the device 10 provided herein includes a roughly S-shaped body adapted to be secured to any of various structural elements and provide a throat 20 for carrying or otherwise managing the placement of one or more cords 120. In an embodiment, the device has a top section 11, a middle section 12, and a bottom section 13. As shown in FIG. 1, the device 10 includes an I-beam flange attachment mechanism 30, a 2"×4" attachment mechanism 40, one or more drywall attachment mechanisms 50, a metal framing stud attachment mechanism 60, and a hook 90 including a throat 20 for holding cords 120. The top section 11 includes a 2"×4" attachment mechanism 40.

Figure 2:
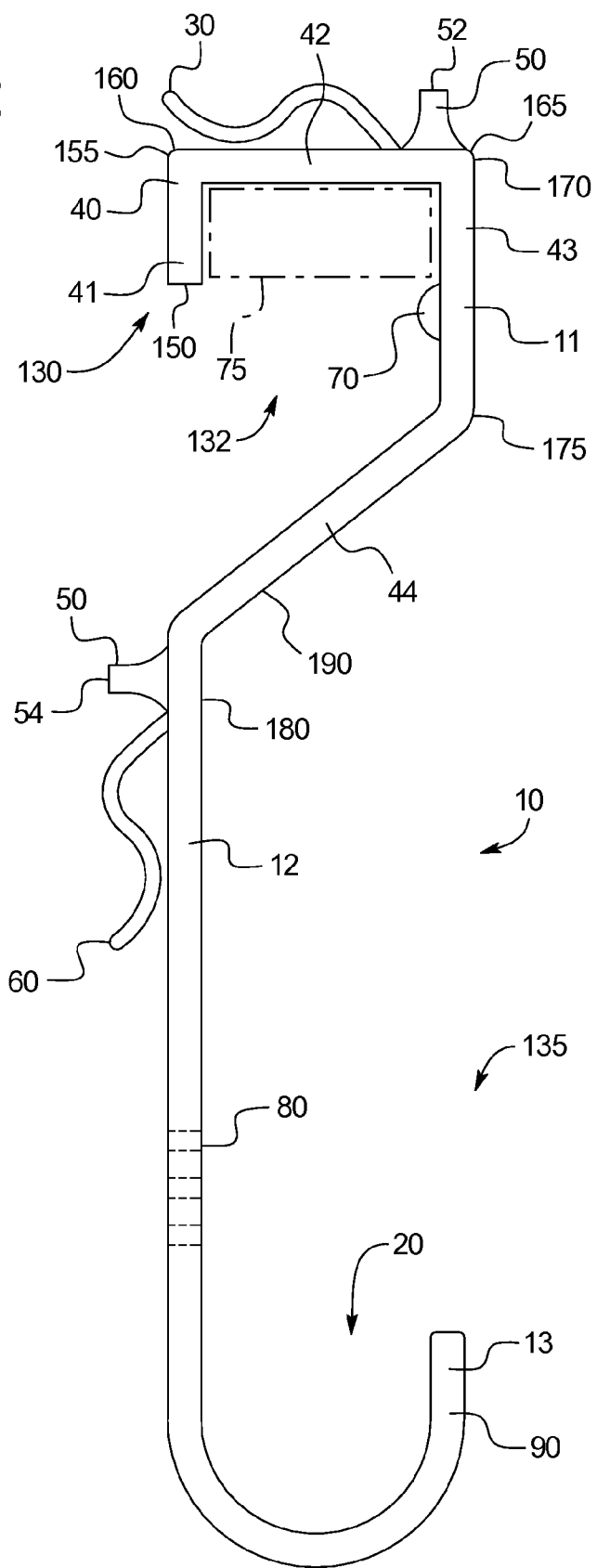
FIG. 2 is a side view of the cable management device of FIG. 1.

In an embodiment, as shown in FIG. 2, the device 10 has a vertical length of approximately eighteen inches. The top section 11 is approximately two inches in length. The middle section 12 is approximately twelve inches in length. The thickness of the device as shown in cross-section in the embodiment of FIG. 2 is approximately one-fourth of an inch. Similarly, the width of the device perpendicular to the cross-section of the embodiment of FIG. 1 is approximately one and one-half inches.

As shown in FIG. 2, the top section 11, the middle section 12, and the bottom section 13 may be manufactured as a single body. Alternatively, as described below, sections of the device 10 may be manufactured as multiple removable pieces. In the embodiment shown in FIGS. 1 and 2, the device 10 is manufactured as a single body of plastic with the exception of the I-beam flange attachment mechanism 30 and the metal framing stud attachment mechanism 60.

The I-beam flange attachment mechanism 30 may be, for example, a metal or plastic clip used to secure the device 10 to the flange of an I-beam. As shown in the appended drawings, the I-beam flange attachment mechanism 30 may be similar in structure and function to the metal clip adapted for use with typical measuring tape housings. In one contemplated embodiment, the I-beam flange attachment mechanism 30 may be located along a generally horizontally disposed upper surface of the device 10. In a preferred embodiment, the I-beam flange attachment mechanism 30 is configured to securely hold at least ten pounds to ensure sufficient cable load capacity. Further, in the preferred embodiment, the I-beam flange attachment mechanism 30 may accept I-beam thickness of at least one-fourth of an inch to five-eighths of an inch to provide for a snug fit. The I-beam flange attachment mechanism 30 may include a tensioner 35 to secure the I-beam flange attachment mechanism 30 to the I-beam flange and prevent the device from sliding off the beam flange. The tensioner 35 may include a wedge swivel that would slide over the clip and press down on the clip to increase grip.

The generally horizontally disposed upper surface of the device 10 may further include a standoff for drywall screws that may function as one of the drywall attachment mechanisms 50, through which a user may secure the device 10 to drywall or similar materials.

Returning to FIG. 1, the 2"×4" attachment mechanism 40 may be used to secure the device 10 to a 2"×4" beam 75. The 2"×4" attachment mechanism 40 may be a generally rectangular three-sided, open structure near the top of the device 10. The size of the opening of the 2"×4" attachment mechanism 40 may be appropriate for securely hanging the device 10 over a horizontally secured 2"×4" beam 75. In the embodiment shown in FIG. 2, the 2"×4" attachment mechanism 40 includes a first wall 41 located along a first plane that transitions to a second wall 42. The second wall 42 is perpendicular to the first wall 41 and defines a second plane. The second wall transitions to a third wall 43. The third wall 43 is perpendicular to the second wall 42 and parallel to the first wall 41. The third wall 43 has a longer vertical length than the first wall 41 to create an opening to permit the device 10 to be hanged on a 2"×4" beam 75. At least one side wall of the 2"×4" attachment mechanism 40 may include a stud bulb 70 for securing the 2"×4" within the 2"×4" attachment mechanism 40. The stud bulb 70 may include a protrusion located along the inner side of the top section 11.

Beneath the 2"×4" attachment mechanism 40, the device may have an angled body portion 44 that leads to a second drywall attachment mechanism, including a stand-off 50 for drywall screws. The standoff 50 may extend from the device a distance equal to the rear most wall of the 2"×4" attachment mechanism 40, such that the rear wall of the 2"×4" attachment mechanism 40 would sit flush against a vertically disposed object to which the device 10 may be secured using the drywall attachment mechanism.

Figure 3:
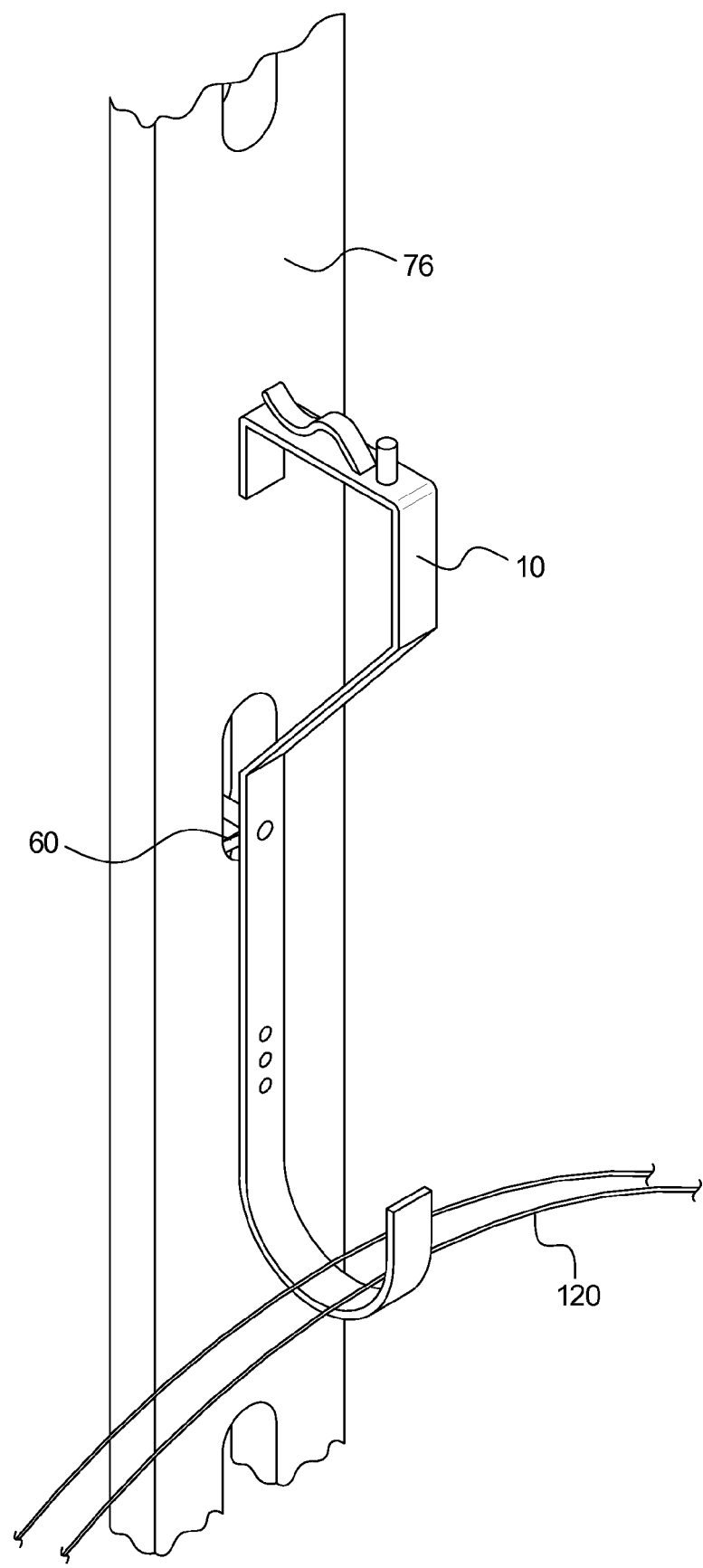
FIG. 3 is a perspective view of the cable management device of FIG. 1 attached to a metal framing stud.

Adjacent to and beneath the second drywall attachment mechanism may be a metal framing stud attachment mechanism 60. FIG. 3 illustrates the device 10 secured to a metal framing stud 76 with the metal framing stud attachment mechanism 60. The metal framing stud attachment mechanism 60 may be similar in form and function to the I-beam flange attachment 30, only with the metal framing stud attachment mechanism 60 being generally vertically disposed at the rear of the device 10, rather than generally horizontally disposed at the top of the device 10. In a preferred embodiment, the metal framing stud attachment mechanism 60 is configured to securely hold at least ten pounds to ensure sufficient cable load capacity. Further, in the preferred embodiment, to provide for a snug fit, the metal framing stud attachment mechanism 60 may accept metal framing stud thickness of at least one-eighth inch.

As shown in FIG. 2, in an embodiment, the cable management device 10 includes a body including a top section 11, a middle section 12, and a bottom section 13. The top section may define a first hook 130, and the first hook 130 may include a first wall 41 located along a first plane. The first wall 41 may include a first end 150 and a second end 155, wherein the first end 150 may be free and the second end 155 may transition to a first end 160 of a second wall 42. The second wall 42 may be perpendicular to the first wall 41 and may define a second plane. A second end 165 of the second wall 42 may transition to a first end 170 of a third wall 43. The third wall 43 may be perpendicular to the second wall 42 and may be parallel to the first wall 41. A second end 165 of the third wall 43 may be located further from the second plane than the first end 150 of the first wall 41 is from the second plane. The second end 175 of the third wall 43 transitions to the middle section 12 that, in turn, transitions to the bottom section 13 of the body. The bottom section 13 of the body may include a second hook 135. The second hook 135 may include a shank portion 180 and a bend portion 190. A first clip, the I-beam flange attachment mechanism 30, may be located along an outer side of the second wall 42 opposite the throat 132 of the first hook 130 and may include a receiving end facing the first plane. A second clip, the metal framing stud attachment mechanism 60, may be located along an outer side of the shank portion 180 opposite the throat 20 of the second hook 135 and may include a receiving end facing the bottom section 13. A first standoff 52 may be located along the outer side of the second wall 42. The first standoff may include a central bore 56 (FIG. 1) extending through a length of the first standoff 52 and through the second wall 42. A second standoff 54 may be located along a side of the shank portion 180 opposite a throat 20 of the second hook 135, wherein the second standoff 54 may include a central bore 55 extending through a length of the second standoff 54 and through the shank portion 180. In some embodiments, the cable management device 10 further includes a removable, rotatable connector 200 including a internally threaded socket 100 and a threaded throat 110 that may connect the second hook 135 to the remainder of the cable management device 10.

One or more knock-out screw holes 80 may be provided at various locations on the device 10. In one example, knock-out screw holes 80 are provided directly beneath the metal framing stud attachment mechanism 60 and above the throat 20. In some instances, the knock-out screw holes 80 may be used as a secondary means for securing the device 10 to an object. For example, one or more of the I-beam flange attachment mechanism 30, the 2"×4" attachment mechanism 40, the one or more drywall attachment mechanisms 50, and/or the metal framing stud attachment mechanism 60 may primarily secure the device 10 to a structure, while one or more screws provided through the knock-out screw holes 80 may secondarily secure the device to the structure.

Figure 4:
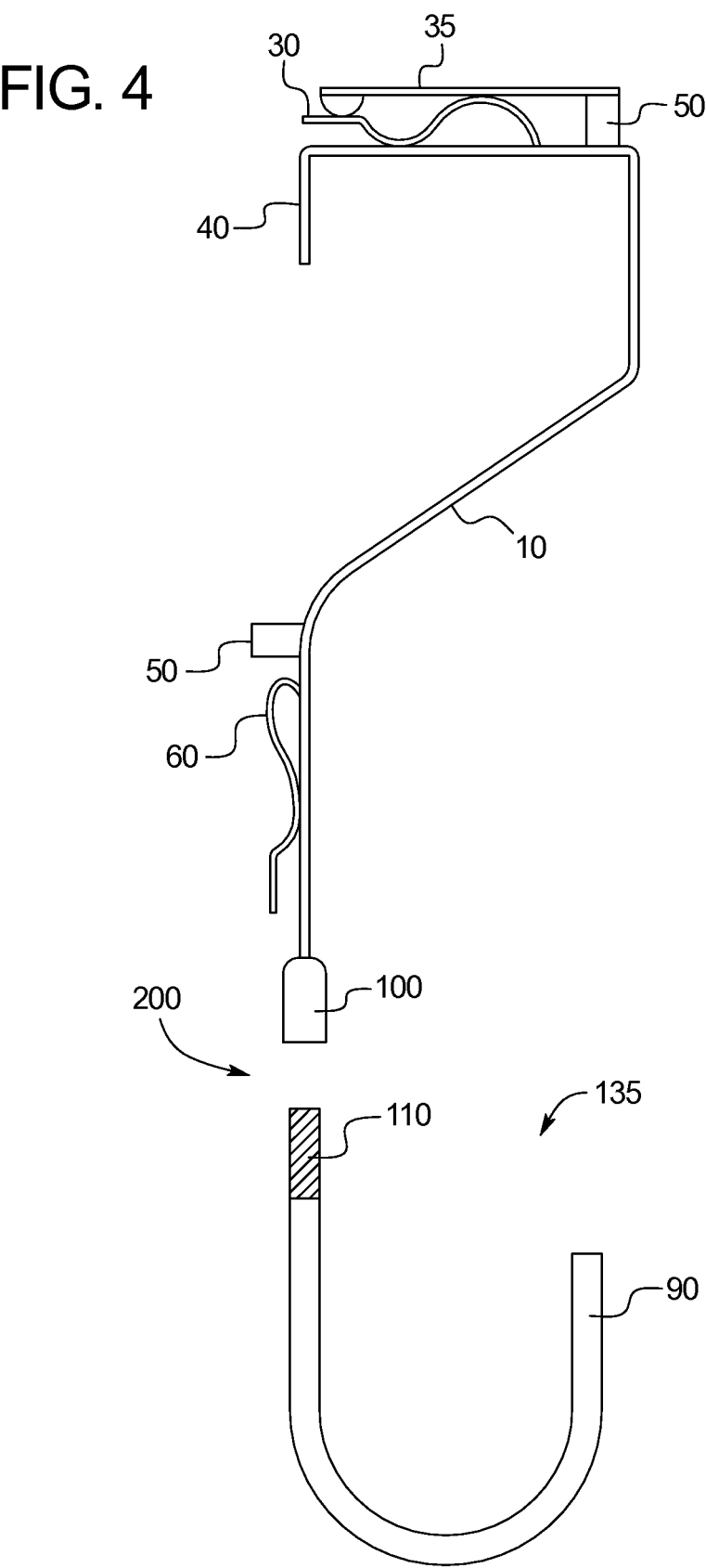
FIG. 4 is a side view of an additional example of a cable management device including a removably secured hook.

At the bottom of the embodiment described, the device 10 may include a throat 20 for managing cords 120. In one example, a single unitary hook 90 defines the throat 20. In other examples, the throat 20 may include a plurality of hooks 90, as shown in FIG. 4. For example, the hooks 90 may be staggered or fanned out horizontally, vertically, or both. Further the hooks 90 may swivel with respect to the body of the device, enabling the hooks 90 to operate in various directions of cord placement. The hook 90 may have a uniform and smooth consistency along the surface defining the throat 20 to enable cords 120 to move freely within the throat 20.

As shown in FIG. 4, in some embodiments of the device 10, the hook 90 may be removably secured to the bottom of the device 10. For example, the body of the device 10 may include an internally threaded socket 100 into which an externally threaded throat 110 may be attached. Additionally, the ability of the device 10 to accept removable throats 110 may enable the device 10 to be used with various throat configurations. In embodiments including a removable secured hook 90, to provide for ease of manufacture of the externally threaded throat 110, the hook 90 may include a round cross-section. Further, the removable secured hook 90 may be manufactured from materials distinct from the materials comprising the remainder of the device 10, such as metals, etc.

As shown in FIG. 5, in some embodiments of the device 10, the device 10 may include a twin hooks design. In the twin hooks design, the bottom section 13 may include at least two hooks 90. The hooks 90 may be separated by approximately ninety degrees, to improve support of the cables. In some embodiments, the hooks 90 of the twin hook design may be removable via a threaded throat 110 that may attach to an internally threaded socket.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A cable management device comprising:
   a body including a top section, a middle section, and a bottom section, the top section defines a first hook, wherein the first hook includes a first wall located along a first plane, the first wall includes a first end and a second end, wherein the first end is free and the second end transitions to a first end of a second wall, wherein the second wall is perpendicular to the first wall, wherein the second wall defines a second plane, wherein a second end of the second wall transitions to a first end of a third wall, wherein the third wall is perpendicular to the second wall and parallel to the first wall, wherein a second end of the third wall is located further from the second plane than the first end of the first wall is from the second plane; wherein the second end of the third wall transitions to the middle section which transitions to the bottom section of the body, wherein the bottom section of the body includes a second hook, wherein the second hook includes a shank portion and a bend portion;
   a first clip located along an outer side of the second wall, further including a receiving end facing the first plane;
   a second clip located along an outer side of the shank portion, further including a receiving end facing the bottom section;
   a first standoff located along the outer side of the second wall, wherein the first standoff includes a central bore extending through a length of the first standoff and through the second wall; and
   a second standoff located along a side of the shank portion opposite a throat of the second hook, wherein the second standoff includes a central bore extending through a length of the second standoff and through the shank portion.

2. The device of claim 1 further including a protrusion located along a side of the third wall facing a throat of the first hook.

3. The device of claim 2 wherein the protrusion is located further from the second plane than the first end of the first wall.

4. The device of claim 1 further including a removable connector connecting the second hook to the body.

5. The device of claim 1 further including a rotatable connector connecting the second hook to the body.

6. The device of claim 1 wherein the bottom section of the body further includes a third hook.

7. The device of claim 6 further including a removable connector connecting the second hook and the third hook to the body.

8. The device of claim 6 further including a rotatable connector connecting the second hook and the third hook to the device.

9. The device of claim 1 wherein the second standoff extends outward from the shank portion to at least a distance the second clip extends from the shank portion.

* * * * *